S. O. RICHARDSON, Jr.
MANUFACTURE OF GLASS.
APPLICATION FILED APR. 14, 1910.
1,004,080.
Patented Sept. 26, 1911.
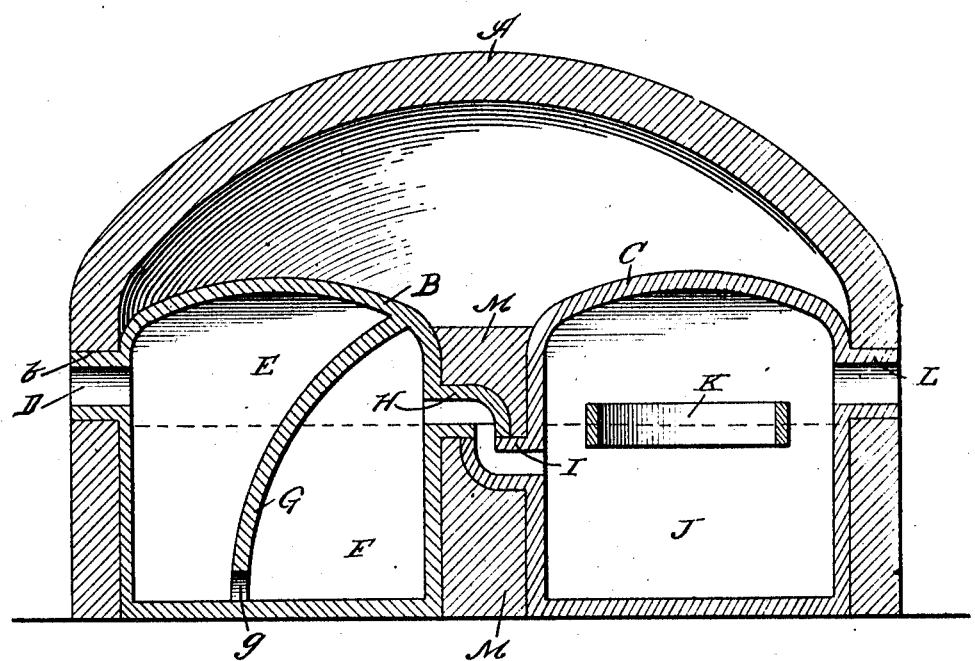

UNITED STATES PATENT OFFICE.

SOLON O. RICHARDSON, JR., OF TOLEDO, OHIO

MANUFACTURE OF GLASS.

1,004,080.　　　Specification of Letters Patent.　　Patented Sept. 26, 1911.

Application filed April 14, 1910. Serial No. 555,433.

*To all whom it may concern:*

Be it known that I, SOLON O. RICHARDSON, Jr., a citizen of the United States, residing at Toledo, in the county of Lucas and State of Ohio, have invented certain new and useful Improvements in the Manufacture of Glass, of which the following is a specification.

My invention relates to improvements in the manufacture of glass and particularly of those kinds, such as lead glass, which require handling in a closed pot or crucible in a glass furnace.

The particular object of my invention is to provide a method for melting glass of this character so as to provide a continuous supply of metal, having the requisite qualities, at the working opening of the furnace.

While, of course, my invention is adaptable for use regardless of whether the glass is worked by hand or by machinery and has the advantage of providing a continuous supply of glass to the pot or pots when pots are used, whereby the pots are kept continuously at a high temperature, instead of being alternately expanded by the heat of the furnace and cooled by a fresh supply of batch, thereby shortening the life of the pots and requiring their frequent replacement, yet my invention is particularly useful in providing a continuous supply of glass at the working opening where the glass is being worked by machinery which requires that the metal shall be maintained at a substantially uniform level adjacent to the working opening. While the process, as has been demonstrated, is of particular value in making pot glass it may also be employed with some advantage in the making of glass in open tank furnaces. In my prior Patent No. 756,409, granted April 5, 1904, I sought to attain these ends by reducing the metal in a melting or reducing pot, which was supplied from time to time with small quantities of batch, so as not to appreciably affect the temperature of the pot, and from which a continuous flow to the working opening served to maintain the metal at the desired level, but, owing to various causes, some of which are not fully understood, but due in part, as I believe, to the fact that the batch, being composed of elements of different specific gravities, separated and did not melt uniformly and produce a homogeneous mixture, I found much difficulty in obtaining a uniform quality of metal at the working opening, sometimes getting satisfactory results and again getting wavy and cordy glass, although the temperatures and formulae used were seemingly such as should have produced metal of a uniform quality at the working opening. After much experiment, I have overcome these difficulties by first reducing the batch to a sufficient extent to prevent objectionable mechanical separation of its elements in vessels from which there is no outflow during this prefusing operation, and then feeding it to a pot in the furnace from which there is a continuous flow to the working or plaining chamber and to the working opening of the furnace, the batch being completely reduced and plained by the time it reaches the working opening. This result may be brought about either by fusing the batch in a preferably closed pot, from which there is no outflow during this step, which is thereupon emptied, by suitable mechanism, into the receiving or reducing pot of the furnace, from which there is a continuous flow to the working chamber and to the working opening, the furnace, receiving or reducing pot, working chamber and working opening being arranged, if desired, as shown in my said Patent No. 756,409, or preferably the fused batch may be emptied from the melting pot and cooled and broken up, in any suitable manner, to form "drygate", which is then fed into the receiving pot from time to time as required to maintain the desired level at the working opening. If this latter course is to be pursued, I find the simplest way is to pour the fused metal into water, whereby it is broken up into relatively small irregular particles, forming a mass which can be readily handled, transported, shoveled and fed into the receiving pot of the furnace from time to time, as desired. The exact action which takes place in the pot during this prefusing is not fully understood, but certain it is that when a batch, for example for lead glass, compounded according to any usual or practical formula, whether with or without "cullet" is reduced in an open or closed pot, from which there is no outflow, the ingredients combine to form a homogeneous metal. In this prefusing step of my process, which in practice I continue for a period of twelve to fourteen hours at a temperature of 2300° to 2500° Fahrenheit, it may be that the separation of the ingredients used to form the metal during the next step of the process is prevented by the fact that, when the prefused mass reaches the reducing chamber, from which there is a continuous outflow the prefusing has caused a mechanical union of the ingredients which prevents their mechanical separation during the succeeding steps, or it may be that the prefusing step has caused a more or less complete chemical union between the ingredients, but, as nearly as I can ascertain, my prefusing step brings about both of these results to a greater or less degree; and certain it is that, if the prefusing step in the pot, from which there is no outflow, is continued for such a period, which will be readily understood by those skilled in the art, there is a complete mechanical and chemical union of the ingredients, the prefused mass can be poured into the receiving chamber of the continuous furnace directly from the reducing or prefusing pot without any intermediate cooling and the mass, when prefused in this manner, may be poured directly into an open tank of a continuous flow furnace, thus dispensing with the use of a receiving pot in the furnace in which the glass or metal receives its final treatment.

In practice, the batch, which I have been using successfully with this process, is composed in part of the ordinary "raw materials" for making lead glass and in part of "cullet," that is, broken glass, and I have attained uniformly successful results by first partially fusing this batch into a mass of substantially the same specific gravity throughout, and pouring it, while in a partially fused condition, into water, whereby it is broken into "drygate" and into convenient form for shoveling into the reducing chamber or end of a continuous flow furnace.

By this arrangement I succeed in providing a continuous flow to the working opening of any kind of glass which requires handling in a closed pot at any stage, in maintaining a substantially uniform level at the working opening, and in producing metal of a uniform, high quality free from all cordiness and similar defects.

While the apparatus of my Patent No. 756,409 may be conveniently used in the practicing of this process, I prefer to use the apparatus shown in the accompanying drawing which shows a longitudinal section through a pot furnace especially adapted for the continuous production of pot glass or crucible glass to be worked by machinery.

In said drawing, A indicates a glass furnace constructed in any usual manner and kept at the desired and usual temperature in any familiar manner, as, for example, by burning gases which fill the interior of the furnace and sufficiently surround the pots B and C to produce the desired metal and keep it in a properly fluid condition. The pot B is the receiving pot, into the feed opening of which the partially fused batch is fed from time to time, the opening D being preferably closed between each filling, in any familiar manner. The pot B is divided into what may conveniently be called a receiving chamber E and plaining chamber F by a partition G, through the bottom of which a passage $g$ communicates with both of said chambers. A discharge spout H leads from the pot B to a receiving spout I of the pot C, the receiving spout I leading into the working chamber J in the pot C, in which preferably a usual form of ring K of refractory material floats upon the metal, and the gathering mechanism of the glass working machine enters the pot C through the working opening L and collects the metal from the inside of the ring K.

The more or less completely fused batch or "drygate," when received in the chamber E of the pot B, is reduced in said chamber, the unmelted parts of the batch, if any, for the most part, floating on the metal in the chamber E and the metal, which is partially plained in the chamber E, flows into the chamber F, where it is further plained, the partition G keeping out of the chamber F any unreduced elements which may be floating on the metal in the chamber E. The clear metal overflows through the spout H into the spout I, said spouts being supported and inclosed by refractory brick work M made, for example, of silica brick, and the clear metal ready for working flows into the pot C, from which it is gathered by the machine. By this arrangement not only is the entire process of reducing, plaining and gathering the metal conducted in closed pots, so that the metal is not at any stage exposed to the reducing gases, but the pot C also sufficiently protects the gathering mechanism from what might be the objectionable heating effect of the gases inside of the furnace. Of course, where the metal is conducted to an open working chamber, the gathering mechanism may be protected by using a so-called "boot leg," one form of which consists of a pot which is open at the bottom and has perforations in the side below the level of the metal, which is allowed to stand in the working tank with its neck fitted into the working opening of the furnace, so that metal from the tank flows freely into the boot leg, while the closed top of the boot leg protects the gathering mechanism from the gases in the furnace.

While I state in the specification and claims that the batch is fused before being fed to the reducing chamber, it will be understood that the degree of fusing is not necessarily important, so long as the batch is sufficiently fused that the different ingredients can no longer mechanically separate to any objectionable extent when the batch is subsequently reduced to metal after being fed into the reducing chamber. In practice, I have found it desirable in this preliminary step, when manufacturing lead glass, to subject the batch to a temperature of 2300° to 2500° Fahrenheit, for a period of twelve to fourteen hours, after which it may be poured directly into the reducing chamber from which the metal, when reduced, flows to the working chamber and working opening, or it may be cooled and broken up in any suitable way and shoveled into the reducing chamber from time to time as required. Obviously however, the batch could be fully reduced in this preliminary step, if desired, and, on the other hand, sufficient fusing to accomplish the results indicated might be attained by a shorter exposure to a reducing temperature. So, also, while I have specially referred to my process as an improvement in the manufacture of lead glass, it will be understood that it is equally applicable to and desirable in the manufacture of any kind of glass which requires initial reduction in a closed pot or chamber as distinguished from glass, such as lime glass, which may be initially reduced, without injury to its quality, in an open tank furnace.

I claim:

1. The improvement in the art of manufacturing glass which comprises fusing the batch, feeding the fused batch into a closed melting chamber, reducing the batch in said chamber, and causing a continuous flow of metal from said chamber to the point where the metal is gathered for working.

2. The improvement in the art of manufacturing glass, which comprises fusing the batch, feeding the same, when so fused, to a closed melting chamber, reducing the batch in said chamber, causing a flow of metal from said chamber to the point where the metal is gathered for working, and continuously feeding additional quantities of fused batch into the melting chamber to replace the metal which is caused to flow from said chamber.

3. The improvement in the manufacture of glass, which comprises feeding fused batch into a zone of reducing temperature, causing the resulting metal to flow to a point where the metal is to be gathered for working, all in a zone of sufficiently high temperature to maintain the metal in a fluid condition, and feeding additional quantities of fused batch to said zone of reducing temperature from time to time as may be required to maintain a substantially uniform level at the gathering point.

4. The improvement in the art of manufacturing lead glass, which comprises fusing the batch in a closed receptacle, from which there is no outflow during the process of fusing, feeding the fused batch into a zone of reducing temperature, causing the resulting metal to flow through a zone of sufficiently high temperature to maintain the metal in a fluid condition to the point where the metal is to be gathered, and adding quantities of fused batch from time to time to said zone of reducing temperature so as to maintain a substantially uniform level at the point where the metal is to be gathered for working.

5. The improvement in the manufacture of lead glass, which comprises fusing the batch in a closed reducing chamber from which there is no outflow during the process of fusing, feeding the fused batch to a closed reducing chamber in a zone of reducing temperature, and causing the resulting metal to flow to a point where the metal is to be gathered for working through a zone of sufficiently high temperature to maintain the metal in a fluid condition.

6. The improvement in the manufacture of lead glass, which comprises fusing the batch in a closed reducing chamber from which there is no outflow during the process of fusing, feeding the fused batch to a closed reducing chamber in a zone of reducing temperature, causing the resulting metal to flow to a point where the metal is to be gathered for working through a zone of sufficiently high temperature to maintain the metal in a fluid condition, and feeding from time to time to said reducing chamber such quantities of fused batch as may be necessary to maintain the metal at a substantially uniform level at the point where it is to be gathered for working.

7. The improvement in the manufacture of glass, which comprises fusing the batch in a closed reducing chamber from which there is no outflow during the process of fusing, feeding the batch at frequent intervals to a closed receiving chamber in a zone of reducing temperature, thereby causing a substantially continuous outflow from said receiving chamber, conducting the resulting metal through inclosed and connecting chambers and passages to the point where the metal is gathered for working, all in the presence of a temperature sufficiently high to keep the metal in a fluid condition and to permit of plaining the same, the entire process being carried on in a connected series of chambers and passages which are closed against access by the burning gases or other means used to produce said desired temperatures.

8. The improvement in the art of glass manufacture, which comprises prefusing the glass ingredients in a receptacle from which there is no outflow during such prefusing step, such prefusing being continued to a point where the ingredients will not objectionably separate in the next steps of the process, then feeding the fused mass into a zone of reducing temperature and causing the resulting metal to flow through said zone to the point of working.

9. The improvement in the art of glass manufacture, which comprises prefusing the glass ingredients in a chamber closed against access by the burning gases furnishing the fusing temperature, such fusing being continued to a point where the ingredients will not objectionably separate in the next steps of the process, then feeding the fused mass into a zone of reducing temperature and causing the resulting metal to flow through said zone toward the point of working at a rate of speed which permits the plaining of the metal between the point of supply and the point of working, the prefused ingredients being fed to the point of supply with sufficient continuity to maintain a substantially constant mass of fluid metal at the point of working to offset the consumption of metal at the point of working.

SOLON O. RICHARDSON, Jr.

Witnesses:
 JOHN H. WRIGHT,
 H. A. PEITER.